(12) United States Patent
Martin (10) Patent No.: US 11,808,069 B2
(45) Date of Patent: Nov. 7, 2023

(54) PRINT IN PLACE ASSEMBLY HINGE

(71) Applicant: TE Connectivity Services GmbH, Schaffhausen (CH)

(72) Inventor: Galen Martin, Middletown, PA (US)

(73) Assignee: TE Connectivity Solutions GmbH, Schaffhausen (CH)

(*) Notice: Subject to any disclaimer, the term of this patent is extended or adjusted under 35 U.S.C. 154(b) by 138 days.

(21) Appl. No.: 17/238,657

(22) Filed: Apr. 23, 2021

(65) Prior Publication Data

US 2022/0341234 A1 Oct. 27, 2022

(51) Int. Cl.
| | |
|---|---|
| *E05D 11/08* | (2006.01) |
| *E05D 11/10* | (2006.01) |
| *E05D 3/02* | (2006.01) |
| *B33Y 80/00* | (2015.01) |
| *B33Y 10/00* | (2015.01) |

(52) U.S. Cl.
CPC ............ *E05D 11/105* (2013.01); *B33Y 10/00* (2014.12); *B33Y 80/00* (2014.12); *E05D 3/02* (2013.01); *E05D 11/1007* (2013.01); *E05D 2003/027* (2013.01); *E05Y 2201/218* (2013.01); *E05Y 2800/45* (2013.01); *E05Y 2900/606* (2013.01)

(58) Field of Classification Search
CPC .............. G06F 1/1681; G06F 1/1616; E05Y 2900/606; E05Y 2201/26; E05Y 2201/218; E05Y 2800/45; H04M 1/0216; E05D 11/082; E05D 11/084; E05D 11/085; E05D 11/105; E05D 11/1007; E05D 3/02; E05D 5/14; E05D 2005/145; E05D 2003/027; F16C 11/04; B33Y 10/00; B33Y 80/00; B65D 85/00; B65D 43/165–169; B65F 1/1646
See application file for complete search history.

(56) References Cited

U.S. PATENT DOCUMENTS

| | | | | |
|---|---|---|---|---|
| 3,600,743 | A * | 8/1971 | Meadows | E05D 11/105 16/335 |
| 5,934,734 | A * | 8/1999 | Wilson | B60J 3/0239 296/97.11 |
| 6,154,927 | A * | 12/2000 | Oi | F16L 3/237 16/386 |
| 6,349,449 | B1 * | 2/2002 | Kuehl | E05D 11/084 16/342 |
| 6,353,967 | B1 * | 3/2002 | Escobar | E05D 11/06 16/374 |
| 2005/0210631 | A1 * | 9/2005 | Anscher | B29C 45/0053 16/386 |

(Continued)

*Primary Examiner* — Chuck Y Mah (57) ABSTRACT

A hinge comprises a first body and a second body irremovably rotatably coupled along a rotational axis of the hinge. The first body and the second body comprise opposing radial bearing surfaces engaged only within a working rotational range of the hinge for fixing the relative position of the first body and the second body in a radial direction with respect to the rotational axis of the hinge. The first body and the second body further define opposing axial bearing surfaces engaged only within the working rotational range of the hinge for fixing the relative position of the first body and the second body in an axial direction with respect to the rotational axis of the hinge. The opposing radial bearing surfaces and the opposing axial bearing surfaces are not engaged outside of the working rotational range.

20 Claims, 6 Drawing Sheets

(56) References Cited

U.S. PATENT DOCUMENTS

| | | | | |
|---|---|---|---|---|
| 2007/0228603 | A1* | 10/2007 | White | E05D 1/00 |
| | | | | 264/263 |
| 2008/0134466 | A1* | 6/2008 | Massengill | B29C 45/0081 |
| | | | | 16/386 |
| 2008/0263821 | A1* | 10/2008 | Levey | B29C 45/0017 |
| | | | | 16/225 |
| 2019/0292821 | A1* | 9/2019 | Gunner | E05D 5/12 |

* cited by examiner

PRINT IN PLACE ASSEMBLY HINGE

FIELD OF THE INVENTION

The present disclosure relates to hinges, and more particularly, to an improved hinge assembly manufactured by an additive process.

BACKGROUND

Hinges are widely used in mechanical systems to enable relative movement between objects or components. Typically, a hinge is embodied either as an assembly of multiple components which are manufactured separately and subsequently interconnected, or as a singular monolithic element, such as a living hinge. While eliminating the need for the production and assembly of multiple components, living hinges have several drawbacks including limited ultimate strength and susceptibility to fatigue and/or plastic strain. Further still, the use of advanced manufacturing techniques, such as three-dimensional (3D) printing or other types of additive processing, are often desired particularly for producing parts in limited quantities. However, creating a single piece or living hinge via these processes has proven problematic. For example, it is often difficult to achieve suitable flexibility and/or longevity in deformable areas of the hinge, while maintaining necessary rigidity and strength in other areas. Likewise, manufacturing traditional multi-piece hinges via additive processes typically results in a hinge with unacceptably large spacing between components, leading to excessive free play of the hinge over its operating or working range.

Accordingly, there is a need for improved hinge assemblies which are manufactured by additive or printing processes.

SUMMARY

A printed, or print in place, hinge or hinge assembly according to an embodiment of the present disclosure comprises a first body and a second body irremovably and rotatably coupled to the first body along a rotational axis of the hinge. The first body and the second body comprise opposing radial bearing surfaces selectively engaged (e.g., contactingly or slidably) within a working rotational range of the hinge. When engaged, the relative position of the first body and the second body in linear radial directions is fixed with respect to the rotational axis of the hinge. The first body and the second body further define opposing axial bearing surfaces selectively engaged within the working rotational range of the hinge for fixing the relative position of the first body and the second body in an axial direction with respect to the rotational axis of the hinge. The opposing radial bearing surfaces and the opposing axial bearing surfaces are not engaged in at least one position outside of the working rotational range of the hinge, enabling manufacturing of the hinge via printing or additive processing.

According to another embodiment of the present disclosure, a printed hinge comprises a first body and a second body rotatably coupled to the first body by an integral bearing pin extending through the first body along a rotational axis of the hinge. The first body and the second body define respective first opposing bearing surfaces rotatably engageable within a working rotational range of the hinge for fixing the relative position of the first body and the second body in a radial direction with respect to the rotational axis of the hinge.

A method of manufacturing a hinge via 3D printing according to an embodiment of the present disclosure includes the step of depositing a first plurality of material layers to form a first body and a second body. The deposited first body comprises an interior surface defining an interior space and the deposited second body comprises an integral bearing pin extending through the interior space of the first body. The bearing pin of the second body defines an exterior bearing surface rotatably engageable with an interior bearing surface defined on the interior surface of the first body. The method further includes the step of depositing a second material and/or structure between and separating the first body and the second body. The second material and/or structure is removed in a subsequent step of the method, enabling the relative rotation of the first and second bodies.

BRIEF DESCRIPTION OF THE DRAWINGS

The invention will now be described by way of example with reference to the accompanying Figures, of which.

DETAILED DESCRIPTION OF THE EMBODIMENTS

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Hinges or hinge assemblies according to embodiments of the present disclosure generally include a first body and a second body manufactured simultaneously via an additive process. As a result, the first and second bodies are irremovably and rotatably connected to one another about a rotational axis of the hinge. The first and second bodies comprise opposing first and second pairs of bearing surfaces, with the first bearing surfaces opposing and engaging one another in a radial direction, and the second bearing surfaces opposing and engaging one another in an axial direction, with respect to the rotational axis of the hinge. In this way, when engaged within a working range of the hinge, the first and second bearing surface pairs fix the first and second bodies in both radial and axial directions, respectively, while permitting relative rotation of the bodies. Outside of the working range of the hinge, or with the first and second bodies in a manufactured position, the bearing surfaces are not engaged and the first and second bodies are completely separated by a continuous gap.

Figure 1A:
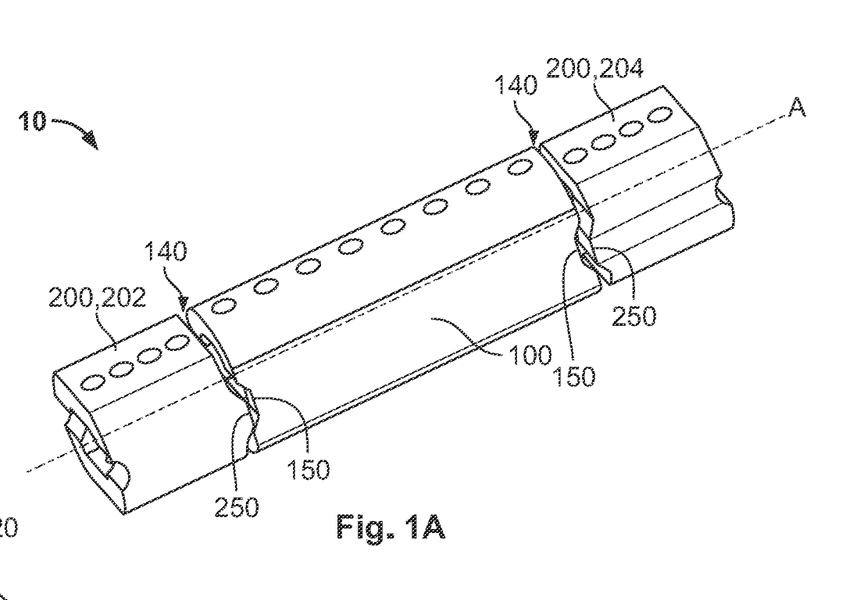
FIG. 1A is perspective view of a hinge assembly according to an embodiment of the present disclosure in a manufactured position.
Figure 1B:
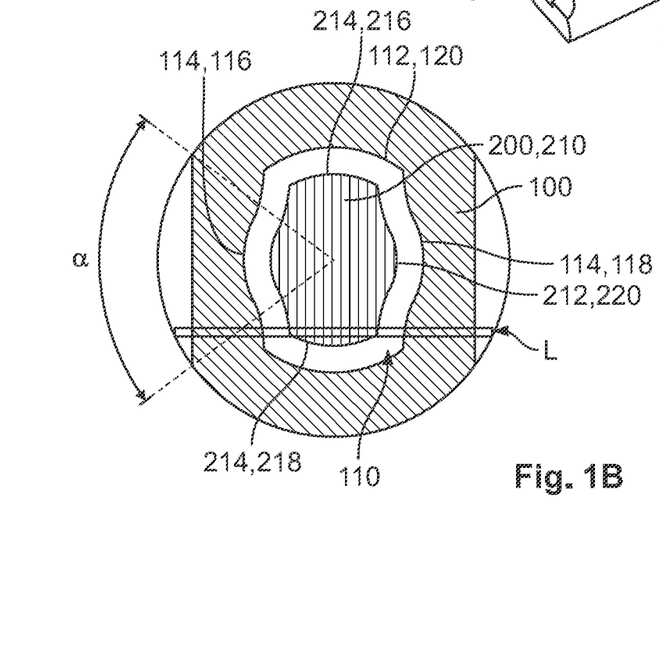
FIG. 1B is a cross-sectional view of the hinge assembly of FIG. 1A.

Referring to FIGS. 1A and 1B, a hinge assembly 10 according to an embodiment of the present disclosure includes a first body 100 and a second body 200 rotatable relative to one another about an axis of rotation A so as to define a mechanical bearing or a hinge. In the exemplary embodiment, the first body 100 comprises a monolithic body (e.g., a 3D printed polymer body) defining a hollow interior passage or space 110 extending therethrough in an axial direction of the assembly 10. The interior space 110 is defined by an inwardly-facing interior surface 112 of the first body 100. As shown in FIG. 1B, the interior surface 112 is formed continuously and radially about the interior space 110. The interior surface 112 defines one or more interior radial bearing surfaces 114 adapted to engage with a corresponding bearing surface of the second body 200. In the exemplary embodiment, the bearing surface 114 comprises a first concave or arcuate segment 116 having an arc length extending over an angle α of approximately 60 to 90 degrees about the axis of rotation of the hinge A, and a second concave or arcuate segment 118 arranged opposite (i.e., centered 180 degrees from) the first segment. The second segment 118 may also comprise an arc length defined over the angle α, by way of example. In one embodiment, each of the arcuate segments 116,118 comprises a constant radius of curvature centered about the rotational axis A of the hinge. Remaining sections 120 of approximately 180 degrees or more of the peripheral interior wall 112 are arranged at a distance further radially outward compared to the arc segments 116,118, such that with the first and second bodies 100,200 in axial alignment along the axis of rotation A, the second body does not contact these remaining sections 120, regardless of their relative rotational or angular position. In this way, the sections 120 do not form part of a bearing surface between the first and second bodies 100,200.

Still referring to FIGS. 1A and 1B, the second body 200 also comprises a monolithic structure defining an integral bearing pin or axle 210 extending through the interior space 110 of the first body 100 in an axial direction of the assembly, and/or along the axis of rotation A. Radially extending or protruding ends 202,204 of the body 200 are arranged on either side of the first body 100 and/or on either end of the bearing pin 210. Each protruding end 202,204 extends in at least one radial direction such that a portion of the end is larger in the radial direction than the bearing pin 210 and/or the interior space 110 defined by the first body 100. In this way, the ends 202,204 irremovably capture the first body 100 on the bearing pin 210, preventing its movement in either axial direction.

An exterior surface 212 of the bearing pin 210 defines at least one exterior bearing surface 214 rotatably engageable with the interior bearing surface 114 of the first body 100. In the exemplary embodiment, the bearing surface 214 comprises a first convex or arcuate segment 216 having an arc length defined relative to the axis of rotation of the hinge A, and a second convex or arcuate segment 218 arranged opposite (i.e., centered 180 degrees from) the first segment 216. The arcuate segments 216,218 are complementary to the segments 116,118 of the bearing surface 114, and define a sliding or otherwise contacting fit therewith. In one embodiment, each of the arcuate segments 216,218 comprises a constant radius of curvature centered at the rotational axis A of the hinge. Remaining sections 220 of the peripheral exterior surface 212 are recessed, or arranged at a distance radially inward from the arc segments 216,218. With the first and second bodies 100,200 aligned with one another along the rotational axis A, the first body does not contact the sections 220, regardless of the relative rotational or angular position of the bodies. In this way, the sections 220 do not form part of a bearing surface with the first and second bodies in axial alignment along the axis of rotation A.

Figure 2A:
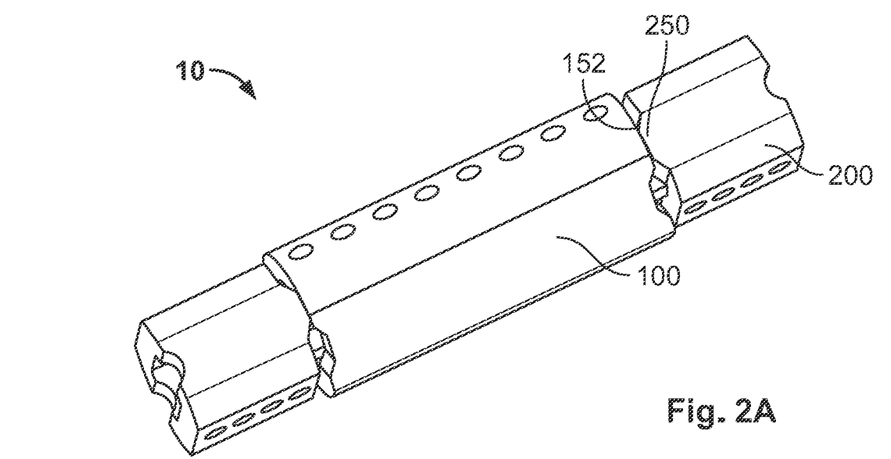
FIG. 2A is perspective view of the hinge assembly of FIG. 1A in a first operating position.
Figure 2B:
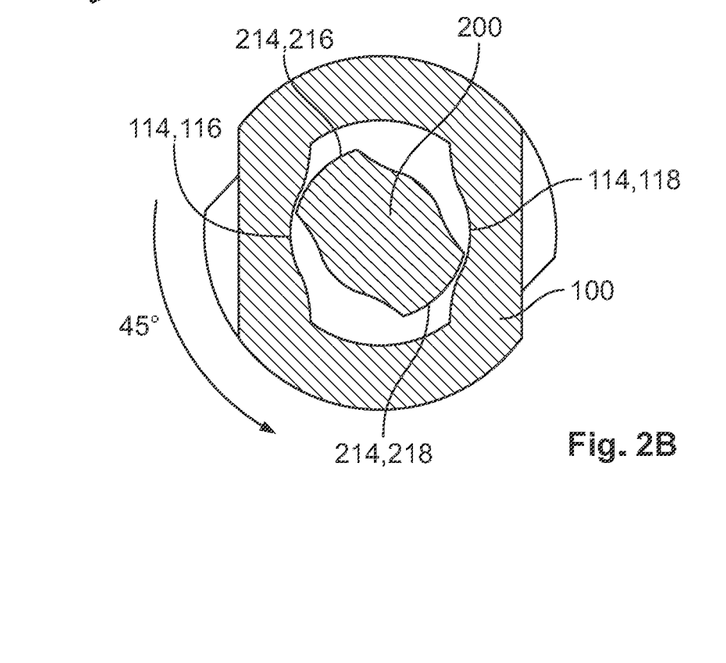
FIG. 2B is a cross-sectional view of the hinge assembly of FIG. 2A.
Figure 3A:
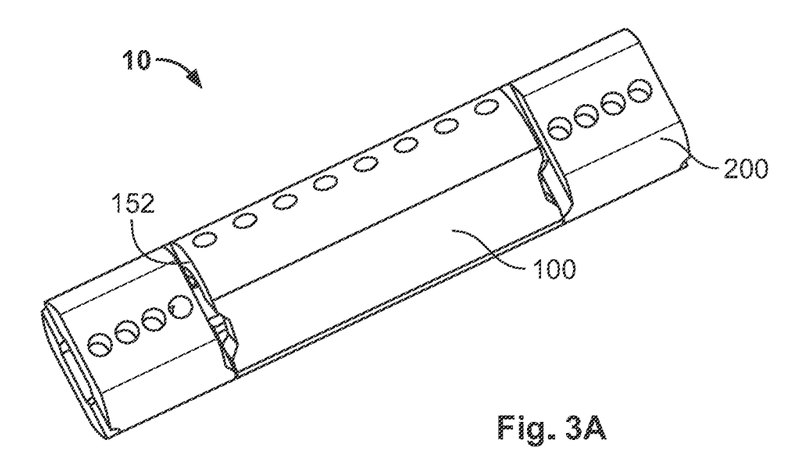
FIG. 3A is perspective view of the hinge assembly of FIG. 1A in a second operating position.
Figure 3B:
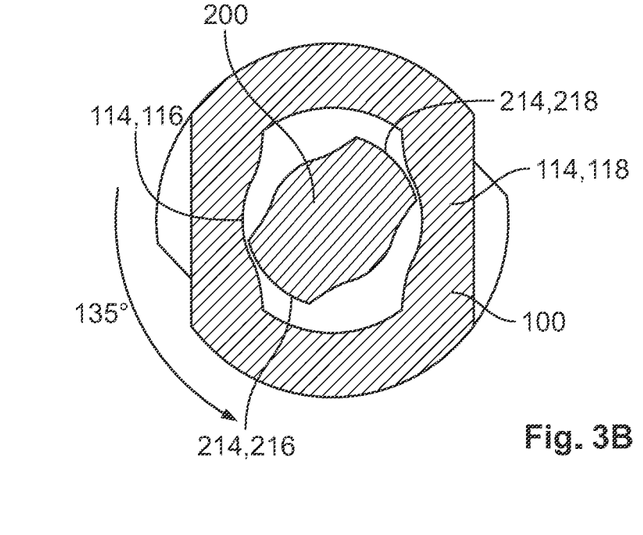
FIG. 3B is a cross-sectional view of the hinge assembly of FIG. 3A.

Referring now to FIGS. 2A-3B, in the exemplary embodiment, the arc length of the abutting interior bearing surface segments 116,118 and exterior bearing surface segments 216,218 are selected such that they engage with one another over at least 90 degrees of relative rotation between the first and second bodies 100,200. It should be understood that the arc length of each of the interior and exterior bearing surface segments may be less than 90 degrees, while still enabling engagement over 90 degrees of rotation. More specifically, FIGS. 2A and 2B illustrated the second body 200 in a first rotational position relative to the first body 100, wherein a first end of the first bearing surface segment 116 and a first end of the second bearing surface segment 216 generally abut one another. The first rotational position corresponds to a first operational position or limit of the hinge, wherein further rotation of the second body 200 in the clockwise direction would result in the bearing surfaces being rotated out of contact with one another. Referring to FIGS. 3A and 3B, the second body 200 is rotatable in the counter-clockwise direction and into a second operational position or limit of the hinge, with the angular distance between the first position and the second position being at least 90 degrees and defining the working rotational range of the hinge. As the interior and exterior bearing surfaces oppose one another in a radial direction of the assembly, within this working range the position of the first body 100 relative to the second body in radially outward directions is fixed via the engagement or abutment of the interior and exterior bearing surfaces. While a working range of approximately 90 degrees is shown, it should be understood that the range may be less than 90 degrees, or greater than 90 degrees. However, it should be understood that the working range must be less than 360 degrees, such that the first body is able to be positioned relative to the second body in an orientation wherein no contact between the first body and the second body exists.

The working range illustrated in FIGS. 2A-3B contrasts to the manufacturing position shown in FIGS. 1A and 1B, wherein a third rotational position of the first body relative to the second body is shown. In the third relative position, the space 110 defines a continuous and uninterrupted radial gap between the interior facing surface 112 of the first body 100 and the exterior facing surface 212 of the integral bearing pin 210. This continuous gap enables production of the complete hinge assembly 10 via additive manufacturing. Specifically, the cross-section illustrated in FIG. 1B is formed via 3D printing, wherein materials may be deposited in a layered manner. The void space(s) between the first and second bodies 100,200 in the finished assembly may be realized via the application of one or more support layers, material or structures in the illustrated void areas during the printing process. These support features comprise material which is removed after the printing process, such as by mechanical means, and/or by heating or dissolving the material. The first and second bodies 100,200 must be formed in the illustrated position, and separated continuously about their inner and outer perimeters via the support material/void space in order to enable their movement in the illustrated finished state.

Similarly, and referring to FIG. 1A, in order to permit relative rotation between the first body 100 and the second body 200, continuous gaps 140 must also be formed between the protruding ends 202,204 of the second body and respective ends of the first body in the axial direction of the hinge. As set forth above, these gaps 140 may be realized via the use of a removable support material introduced by the additive process between the first body 100 and the second body. However, like the gap or space 110, the formation of the gaps 140 introduce axial play between the first and second bodies 100,200 in the illustrated manufactured position shown in FIG. 1A. In order to address this deficiency and further limit the relative axial motion of the components, the protruding ends 202,204 of the second body 200 each define a protruding bearing surface 250, with a corresponding recess 150 being formed in the first body 100 and receiving the bearing surface 250 in the manufactured position. In the working positions shown in FIGS. 2A and 3A, the bearing surfaces 250 are configured to engage with corresponding bearing surfaces 152 of the first body 100 over the same working range of the hinge. Similar to the sliding fit achieved between the above-described bearing surfaces 114,214 for limiting radial play, the bearing surfaces 152, 250 oppose one another in the axial direction, and thus eliminate or limit axial play between the first and second bodies 100,200 as the hinge assembly is rotated.

Figure 1C:
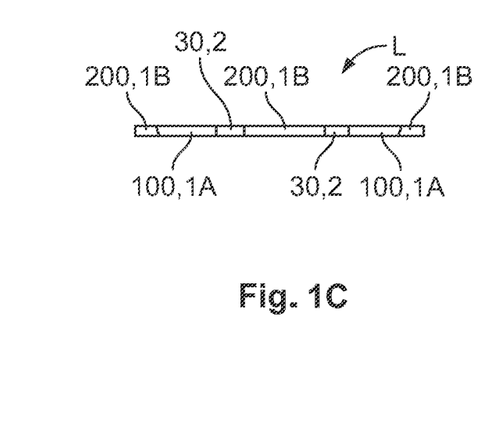
FIG. 1C is a cross-sectional view of a printed intermediate layer used to describe a manufacturing process of the hinge assembly of FIGS. 1A and 1B.

With reference to FIGS. 1B and 1C, an exemplary deposited layer L useful for describing a manufacturing process of the hinge assembly 10 is shown. The layer L comprises an intermediate layer of a plurality of layers applied or printed in a stacked or vertical manner in order to form the hinge assembly 10. The exemplary layer L includes a deposition of a material 1A defining a portion of the first body 100, a deposition of a support material 2 defining a support structure 30. A deposition of material 1B defines the second body 200, and may comprise the same or different material than the material 1A. The material 2 defining the support structure 30 is deposited between the materials 1A and 1B (e.g., may be deposited prior to the deposition of at least one of the materials 1A and 1B), preventing the materials 1A and 1B, and thus the first and second bodies 100,200, from becoming mechanical joined together during manufacturing. The support structure 30 may be removed in a subsequent processing step via, for example, mechanical extraction, dissolution or heating of the material 2. Once removed, the hinge assembly 10 is free to articulate or rotate in the above-described manner.

Figure 4:
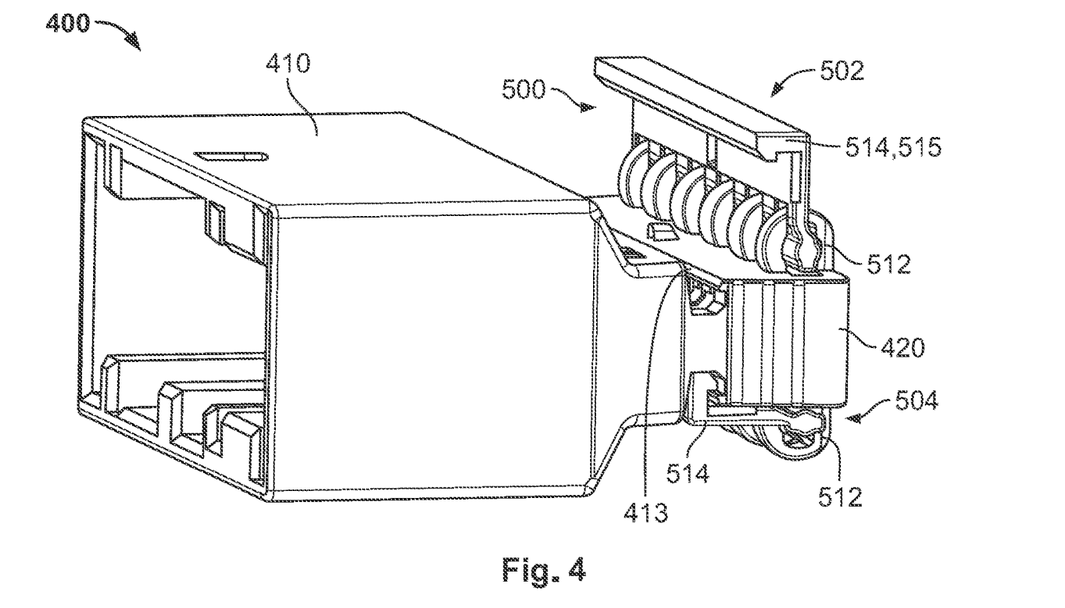
FIG. 4 is a side perspective view of an exemplary electrical connector utilizing a hinge assembly according to an embodiment of the present disclosure.
Figure 5:
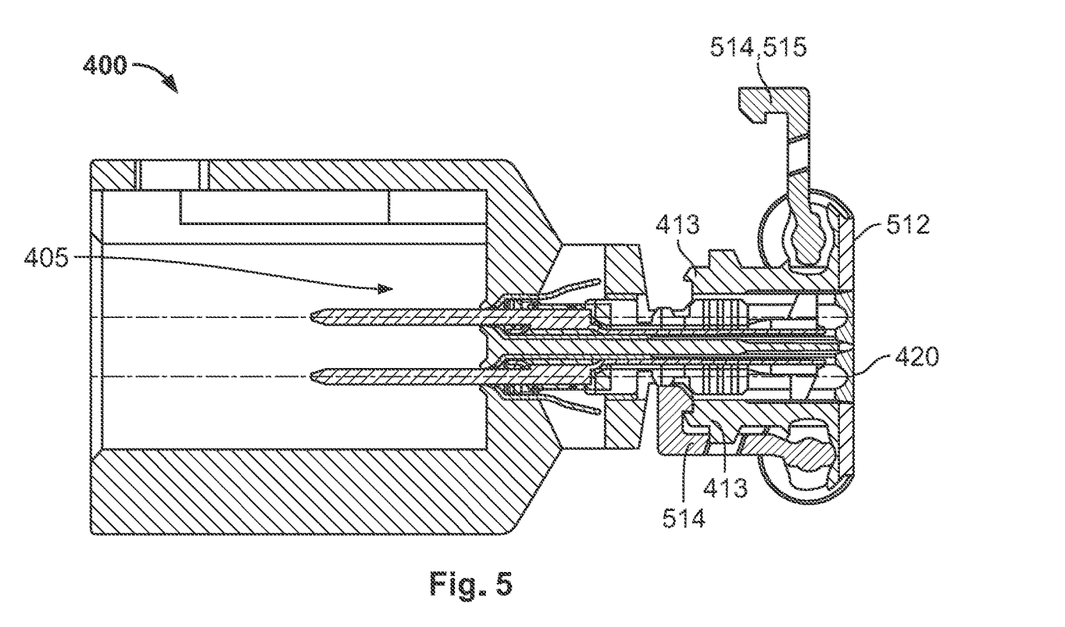
FIG. 5 is a side cross-sectional view of the electrical connector and hinge assembly of FIG. 4.

Referring now to FIGS. 4 and 5, an exemplary electrical connector 400 utilizing a plurality of hinge assemblies according to embodiments of the present disclosure is shown. The exemplary connector 400 includes a connector body 410 into which a terminal assembly 405 is inserted. A terminal holder 420 is selectively mateable to a rear of the connector body 410 for securing the terminal assembly 405 thereto. In the mated position, as shown in FIG. 5, a plurality of terminals of the terminal assembly 405 extend into a receiving space the connector body 410 for mating with a mating terminal or connector (not shown) insertable into the receiving space. The terminal holder 420 is selectively fixable to the connector body 410 in the illustrated mated position via a locking assembly 500, including first and second hinge assemblies 502,504 arranged on either side of the terminal holder. Similar to the hinge assembly 10, each hinge assembly 502,504 includes a first body 512 and a second body 514 formed simultaneously via the above-described 3D printing process. Each of the second bodies 514 includes a latching end 515 for engaging with a corresponding latching feature or protrusion 413 defined on the connector body 410.

In the exemplary embodiment, the first hinge assembly 502 is shown in the manufactured position, as shown above in FIG. 1B. In this position the bearing surfaces of a bearing pin of the second body 514 are not engaged with corresponding interior bearing surfaces of the first body 512, as required for the manufacturing of each of the hinge assembles 502,504 via an additive process. In distinction, the second hinge assembly 504 is in an operational position, wherein the latching end 515 is engaged with the latching feature 413 of the connector body 410. As set forth above with respect to FIGS. 2A-3B, as the radial position of the second body 514 is fixed relative to the first body 512 through the working range, the position of the latching end 515 is fixed at a predetermined radial distance for proper alignment, and subsequent engagement with, the latching feature 413. In this way, despite being initially formed with the radial gap between the first and second bodies, in the working range of positions, the hinge functions as intended, permitting rotation only about a single axis while preventing motion in axial and radial directions.

Figure 6:
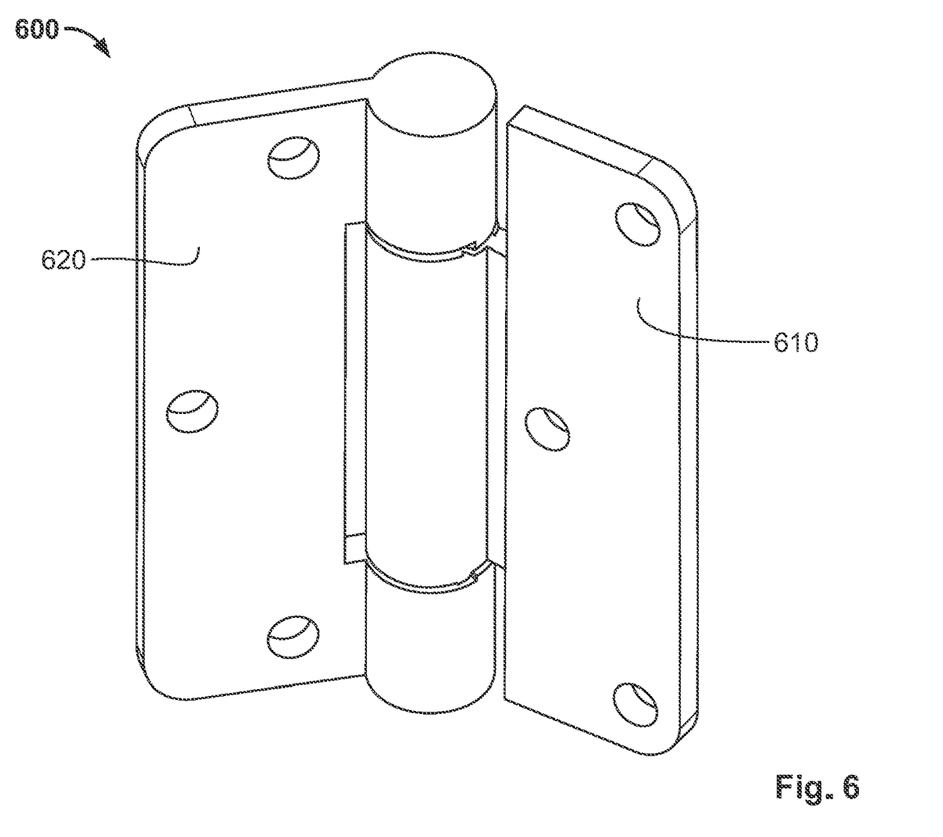
FIG. 6 is a perspective view of a hinge assembly according to another embodiment of the present disclosure in a manufactured position.
Figure 7:
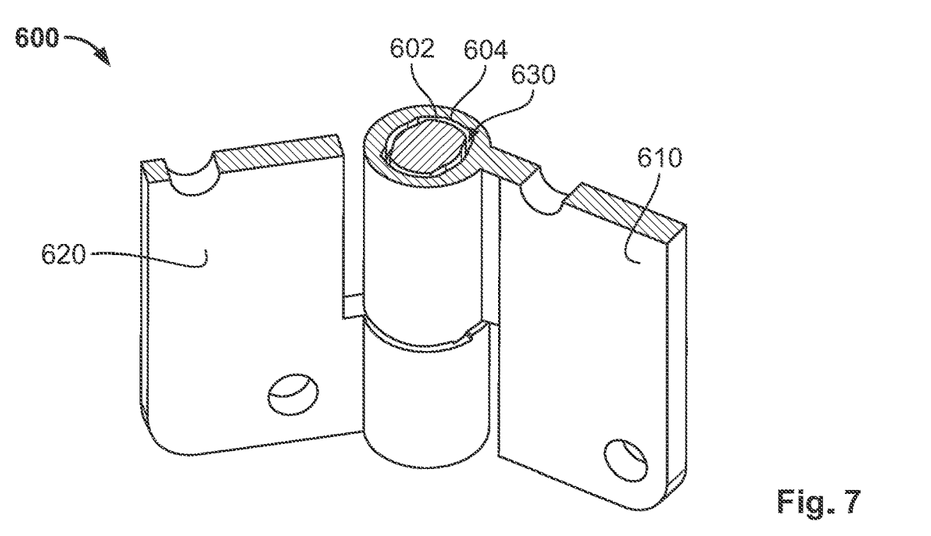
FIG. 7 is a perspective cross-sectional view of the hinge assembly of FIG. 6.
Figure 8:
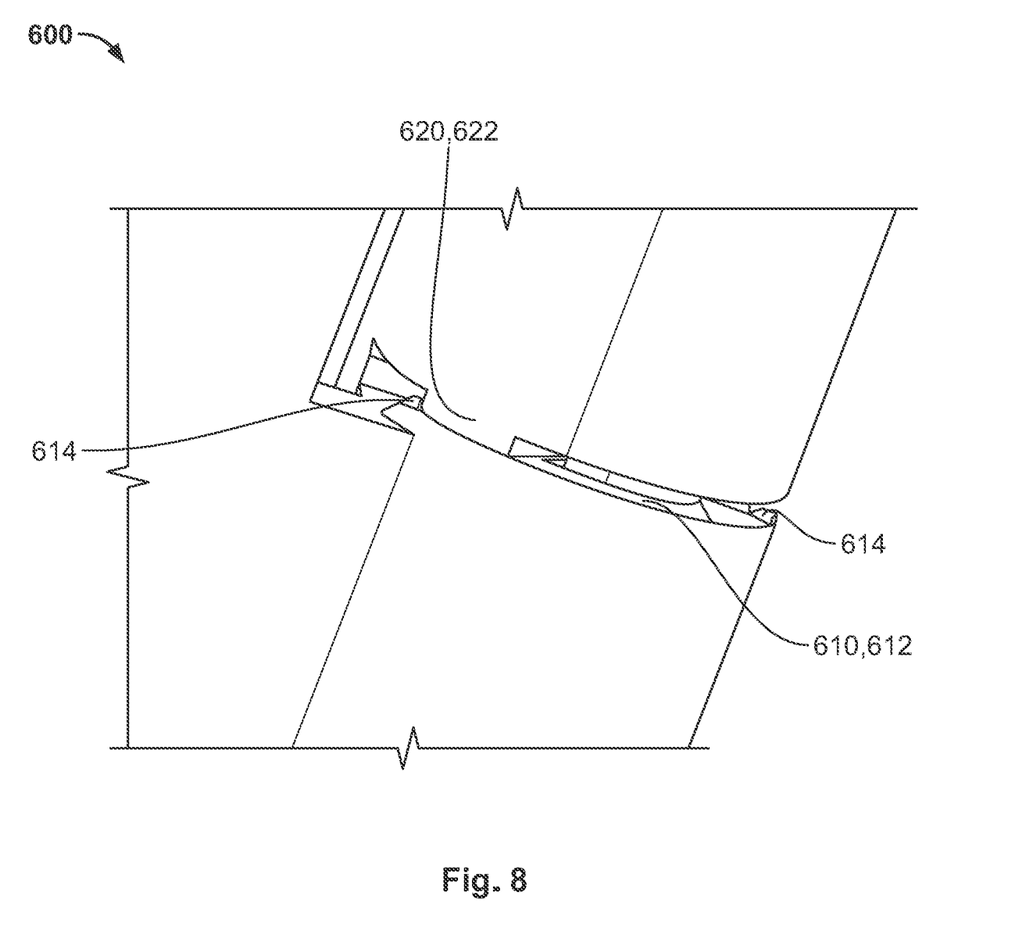
FIG. 8 is a detailed view of a portion of the hinge assembly of FIGS. 6 and 7 in a first operating position.

Referring to FIGS. 6-8, a hinge assembly 600 according to another embodiment of the present disclosure is implemented in the general form of a convention door hinge. Regarding FIGS. 6 and 7, the hinge assembly 600 is shown in a manufactured position, and includes integrally formed, flange-like first and second bodies 610,620 having features similar to those set forth above with respect to the preceding embodiments. Particularly, as shown in FIG. 7, a continuous radial gap 630 is formed between the first and second bodies 610,620 during the manufacturing process, separating associated radial bearing surfaces 602,604 which engage one another only upon subsequent rotation of the first body 610 relative to the second body 620. As shown in FIG. 8, in addition to the radial bearing surfaces, the hinge assembly 600 further comprises axial bearing surfaces 612,622 for limiting axial motion between the bodies 610,620 in the working range of the hinge, as set forth above with respect to the previous embodiments. Additionally, the first body 610 also defines working range limiting features, embodied herein as limiting protrusions 614 formed on the ends of the bearing surface 612 of the first body. As shown, the bearing surface 622 or corresponding protrusion of the second body 620 will engage with each limiting protrusion 614 at each end of the working rotational range of the hinge assembly. In this way, a user manually manipulating the hinge will be able to feel when the hinge is within the working range, or at the limits of the working range, by the resistance generated by these limiting features or protrusions 614. While embodied as exemplary protrusions, it should be understood that similar limiting features may also be embodied as detents or recesses (with or without corresponding protrusions), which may be formed on any surfaces of the hinge assembly 600 which oppose one another and experience relative motion. The limiting features are particularly beneficial in providing an indication to a user when the hinge has moved from the manufactured position and into the working position, or range of positions, based on feel. The limiting features also act to mechanically retain the hinge assembly within the working range once placed therein. It should be understood that these limiting features may be utilized in any and all embodiments of the present disclosure in a similar manner, with their application to the hinge of FIGS. 6-8 being a non-limiting example only.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A printed hinge, comprising:
   a first body including a hollow interior space defined along a rotational axis of the hinge; and
   a second body rotatably coupled to the first body along the rotational axis of the hinge, including:
      a pair of radially extending protrusions, the first body arranged between the pair of protrusions such that axial motion of the first body relative to the second body along the rotational axis of the hinge is prevented; and
      an integral bearing pin defined between the pair of protrusions and extending through the interior space of the first body along the rotational axis of the hinge, the first body and the second body comprising opposing radial bearing surfaces engaged within a rotational range of the hinge for fixing the relative position of the first body and the second body in a radial direction with respect to the rotational axis of the hinge, and opposing axial bearing surfaces engaged within the rotational range of the hinge for fixing the relative position of the first body and the second body in an axial direction with respect to the rotational axis of the hinge, the opposing radial bearing surfaces and the opposing axial bearing surfaces are slidably engaged within the rotational range of the hinge and the opposing radial bearing surfaces and the opposing axial bearing surfaces are not engaged outside of the rotational range of the hinge.

2. The printed hinge of claim 1, wherein in at least one relative rotational orientation outside of the rotational range of the hinge, the first body is completely separated from the second body such that no portion of the first body contacts the second body.

3. The printed hinge of claim 1, wherein the rotational range corresponds to at least 90 degrees of relative rotation between the first body and the second body about the rotational axis of the hinge.

4. A hinge, comprising:
   a first body; and
   a second monolithic body including an integral bearing pin defined between a pair of radially extending protrusions, the second body rotatably coupled to the first body by the integral bearing pin extending through the first body along a rotational axis of the hinge, the first body captured between the pair of protrusions such that axial motion of the first body relative to the second body along the rotational axis of the hinge is prevented, the first body and the second body defining respective first opposing bearing surfaces rotatably engaged within a predetermined rotational range of the hinge for fixing the relative position of the first body and the second body in a radial direction with respect to the rotational axis of the hinge.

5. The hinge of claim 4, wherein the bearing pin extends through an opening in the first body formed in a direction of the rotational axis of the hinge, the first bearing surface of the first body is formed on an interior surface of the opening and defines a first arc segment having an arc length extending over a first portion of the interior surface of the opening with respect to the axis of rotation of the hinge.

6. The hinge of claim 5, wherein the first bearing surface of the second body is defined on an exterior surface of the bearing pin.

7. The hinge of claim 6, wherein a remainder of the interior surface of the opening is defined further radially outward than the first bearing surface of the first body with respect to the rotational axis of the hinge, and wherein a remainder of the exterior surface of the bearing pin is arranged further radially inward than the first bearing surface of the bearing pin with respect to the rotational axis of the hinge.

8. The hinge of claim 7, wherein the first bearing surface of the bearing pin slidingly engages with the first arc segment of the first bearing surface of the first body over its length in response to the relative rotation of the first body and the second body between a first rotational position and a second rotational position about the rotational axis of the hinge.

9. The hinge of claim 8, wherein between the first rotational position and the second rotational position of the first body and the second body, the position of the first body relative to the second body in a radial direction is fixed via the engagement of the first bearing surfaces.

10. The hinge of claim 9, wherein in a third rotational position of the first body relative to the second body, a continuous and uninterrupted radial gap is defined between the interior surface of the opening and the exterior surface of the bearing pin.

11. The hinge of claim 10, wherein in the third rotational position, the first body is completely separated from the second body such that no portion of the first body contacts the second body.

12. The hinge of claim 5, wherein the first bearing surface of the second body defines a first arc segment for slidably engaging with the first arc segment of the first bearing surface of the first body, wherein the arc lengths of the first arc segments enable engagement over at least 90 degrees relative rotation of the first body and the second body.

13. The hinge of claim 12, wherein the first bearing surface of the first body further defines a second arc segment arranged opposite the first arc segment and having an arc length extending over a second portion of the interior surface with respect to the rotational axis of the hinge, wherein the first bearing surface of the second body comprises a second arc segment for slidably engaging with the second arc segment of the first bearing surface of the first body.

14. The hinge of claim 4, wherein the first body and the second body define opposing second bearing surfaces engaged within the rotational range of the hinge for fixing the relative position of the first body and the second body in an axial direction with respect to the rotational axis of the hinge, the opposing second bearing surface of the second body formed on at least one of the pair of protrusions.

15. The hinge of claim 4, wherein the first body and the second body are formed from a plurality of stacked deposited layers.

16. A printed hinge, comprising:
a first body including:
 a first radial bearing surface; and
 a first axial bearing surface including at least one first axially extending protrusion; and
a second body rotatably coupled to the first body along a rotational axis of the hinge, including:
 a pair of radially extending protrusions;
 an integral bearing pin defined between the radially extending protrusions;
 a second radial bearing surface opposing and slidably engaging with the first radial bearing surface in a radial direction within a rotational range of the hinge for fixing the relative position of the first body and the second body in the radial direction with respect to the rotational axis of the hinge; and
 a second axial bearing surface including at least one second axially extending protrusion opposing and slidably engaging with the at least one first axial extending protrusion in an axial direction within the rotational range of the hinge for fixing the relative position of the first body and the second body in the axial direction with respect to the rotational axis of the hinge.

17. The printed hinge of claim 16, wherein the at least one second axially extending protrusion is formed on one of the pair of radially extending protrusions of the second body.

18. The printed hinge of claim 17, wherein outside of the rotational range of the hinge, the at least one first and second axially extending protrusions are not engaged such that the first body and the second body are not in contact with one another in the axial direction.

19. The printed hinge of claim 18, wherein outside of the rotational range of the hinge:
the at least one first axially extending protrusion of the first body is received within at least one first recess formed in the axial direction into the one of the pair of radially extending protrusions of the second body; and
the at least one second axially extending protrusion of the second body is received within at least one second recess formed in the axial direction into the first body.

20. The printed hinge of claim 17, wherein:
the at least one first axially extending protrusion includes a pair of first axially extending protrusions formed on opposite sides of the first body; and
the at least one second axially extending protrusion includes a pair of second axially extending protrusions, each second axially extending protrusion formed on a respective one of the pair of radially extending protrusions of the second body.

* * * * *